(12) United States Patent
Shiba et al.

(10) Patent No.: US 12,434,415 B2
(45) Date of Patent: Oct. 7, 2025

(54) METHOD FOR PRODUCING RECORDED MATTER HAVING THREE-DIMENSIONAL IMAGE, DEVICE FOR PRODUCING RECORDED MATTER HAVING THREE-DIMENSIONAL IMAGE, AND FOAM-PROMOTING LIQUID

(71) Applicant: CANON KABUSHIKI KAISHA, Tokyo (JP)

(72) Inventors: Tetsufumi Shiba, Kanagawa (JP); Olivia Herlambang, Kanagawa (JP); Yoshiyuki Nagase, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 100 days.

(21) Appl. No.: 18/314,239

(22) Filed: May 9, 2023

(65) Prior Publication Data

US 2023/0271357 A1    Aug. 31, 2023

Related U.S. Application Data

(63) Continuation of application No. PCT/JP2021/042301, filed on Nov. 17, 2021.

(30) Foreign Application Priority Data

Nov. 18, 2020   (JP) ................. 2020-191592

(51) Int. Cl.
*B29C 44/22*    (2006.01)
*B29C 44/02*    (2006.01)
(Continued)

(52) U.S. Cl.
CPC ........ *B29C 44/022* (2013.01); *B29C 44/0407* (2013.01); *B29C 44/12* (2013.01); *B29C 44/3415* (2013.01); *B29C 44/355* (2013.01)

(58) Field of Classification Search
None
See application file for complete search history.

(56) References Cited

U.S. PATENT DOCUMENTS

2022/0105665 A1*  4/2022  Yamada ................. B41F 23/04
2023/0173836 A1   6/2023  Tanaka et al.

FOREIGN PATENT DOCUMENTS

EP    0 765 763 A2    4/1997
JP    9-207428 A      8/1997
(Continued)

OTHER PUBLICATIONS

Yamada JP2020050719A English Translation 2020 (Year: 2020).*
(Continued)

*Primary Examiner* — Jacob T Minskey
*Assistant Examiner* — Adrien J Bernard
(74) *Attorney, Agent, or Firm* — Venable LLP

(57) ABSTRACT

A recorded matter having a three-dimensional image is produced by a method comprising the steps of: applying, to a recording medium including a substrate and a foaming layer provided thereon, a foam-promoting liquid containing water and a foam-promoting component; and heating the foaming layer. The foaming layer contains a binder resin and a foaming particle which foams as heated, while the foam-promoting component lowers a foaming start temperature of the foaming particle. The foaming particle includes a shell layer containing a thermoplastic resin and a volatile material encapsulated in the shell layer. The binder resin contains a water-insoluble resin, while the foam-promoting component contains a compound having no hydroxyl group.

12 Claims, 2 Drawing Sheets

(51) Int. Cl.
  *B29C 44/04* (2006.01)
  *B29C 44/12* (2006.01)
  *B29C 44/34* (2006.01)

(56) References Cited

FOREIGN PATENT DOCUMENTS

| JP | 10-129116 A | 5/1998 |
| JP | 2001-30398 A | 2/2001 |
| JP | 2001-150812 A | 6/2001 |
| JP | 2005-088341 A | 4/2005 |
| JP | 2014-514187 A | 6/2014 |
| JP | 2020-050719 A | 4/2020 |
| WO | 2013/050815 A1 | 4/2013 |
| WO | 2022/107827 A1 | 5/2022 |

OTHER PUBLICATIONS

U.S. Appl. No. 18/182,533, filed Mar. 13, 2023, Herlambang et al.
International Search Report in International Application No. PCT/JP2021/042301 (Feb. 2022).
IntInternational Preliminary Report on Patentability in International Application No. PCT/JP2021/042301 (May 2023).
First Office Action in Chinese Application No. 202180077534.2 (Mar. 2025).

* cited by examiner

METHOD FOR PRODUCING RECORDED MATTER HAVING THREE-DIMENSIONAL IMAGE, DEVICE FOR PRODUCING RECORDED MATTER HAVING THREE-DIMENSIONAL IMAGE, AND FOAM-PROMOTING LIQUID

CROSS-REFERENCE TO RELATED APPLICATIONS

This application is a Continuation of International Patent Application No. PCT/JP2021/042301, filed Nov. 17, 2021, which claims the benefit of Japanese Patent Application No. 2020-191592, filed Nov. 18, 2020, both of which are hereby incorporated by reference herein in their entirety.

BACKGROUND OF THE INVENTION

Field of the Invention

The present invention relates to a method for producing a recorded matter having a three-dimensional image, a device for producing a recorded matter having a three-dimensional image, and a foam-promoting liquid.

Description of the Related Art

Three-dimensional images such as wall papers and Braille have conventionally been formed by overcoating methods using UV inks, physical extrusion methods such as embossing, and printing methods using 3D printers and thermal expansion plastic foams, and the like. Among these, it has been known that thermal expansion plastic foams express functions such as thermal barrier properties, thermal insulation properties, sound insulation properties, sound absorption properties, vibration insulation properties, and reductions in weight depending on the materials of the foams, the states of formed bubbles, and the like.

In the field of wall papers, a technique has been known that uses an azo compound such as azodicarbonamide (ADCA) as a foaming agent, and forms an uneven structure by foaming a foaming layer containing such a foaming agent and a resin such as polyvinyl chloride. For example, a method has been proposed which includes: recording an image with an ink containing a color material having light absorption properties, and then irradiating the image with light to generate a difference in heating in accordance with the light absorption properties and selectively raise a foaming layer, forming a three-dimensional image (Japanese Patent Application Laid-Open No. H09-207428).

In addition, the following method has been proposed (Japanese Patent Application Laid-Open No. 2001-150812). A flat image is recorded on a surface of a foamable sheet and a shaded image (light-absorbing pattern) based on distance image data which expresses a three-dimensional shape is formed on a surface of a substrate layer of the foamable sheet. Then, light is applied from the substrate layer side to generate heat in accordance with the grayscale of the image, thus expanding the foamable sheet in accordance with the distance image data. Moreover, a method has been proposed that includes: attaching a liquid for suppressing, inhibiting, or promoting expansion to a thermal expansion layer containing polyvinyl chloride or an acrylic resin and a chemical foaming agent; and then heating to form an uneven structure (Japanese Patent Application Laid-Open No. 2014-514187). In addition, a method has been proposed that includes: applying or printing a plasticizer for a shell wall resin of foamable capsules on a three-dimensional image forming layer made of a recorded material for forming a three-dimensional image in which the three-dimensional image forming layer containing foamable capsules is provided; and heating and foaming the foamable capsules to form a three-dimensional image (Japanese Patent Application Laid-Open No. H10-129116).

However, in the method proposed by Japanese Patent Application Laid-Open No. H09-207428, it is necessary to apply an ink containing a color material having high light absorption properties such as a black ink to a portion desired to be thermally foamed. For this reason, it is difficult to foam a portion to which an ink containing a color material having low light absorption properties. In addition, in the case of the method proposed by Japanese Patent Application Laid-Open No. 2001-150812, since a light-absorbing pattern is not directly formed in a foaming layer, it is difficult to sufficiently foam the foaming layer. Moreover, in the method proposed by Published Japanese Patent Application Laid-Open No. 2014-514187, since a chemical foaming agent is used, variations are likely to be generated in a foamed portion, making it difficult to express clear unevenness. In addition, in the method proposed by Japanese Patent Application Laid-Open No. H10-129116, since there is a case where a three-dimensional image forming layer is peeled off the support when foamable capsules are foamed, further amelioration has been needed.

Hence, an object of the present invention is to provide a method for producing a recorded matter having a three-dimensional image, capable of easily forming a three-dimensional image in which clear unevenness is expressed and suppressing peeling of the foaming layer from the substrate. In addition, an object of the present invention is to provide a device for producing a recorded matter having a three-dimensional image, capable of easily forming a three-dimensional image in which clear unevenness is expressed and suppressing peeling of the foaming layer off the substrate. Moreover, an object of the present invention is to provide a foam-promoting liquid for use in the above-described method for producing a recorded matter having a three-dimensional image.

SUMMARY OF THE INVENTION

Specifically, the present invention provides a method for producing a recorded matter having a three-dimensional image, including the steps of: applying, to a recording medium including a substrate and a foaming layer being provided on the substrate and containing a binder resin and a foaming particle which is foamed by heat, a foam-promoting liquid containing water and a foam-promoting component which lowers a foaming start temperature of the foaming particle; and foaming the foaming particle to form a three-dimensional image by heating the foaming layer of the recording medium to which the foam-promoting liquid has been applied, wherein the foaming particle includes: a shell layer containing a thermoplastic resin; and a volatile material encapsulated in the shell layer, the binder resin contains a water-insoluble resin, the foam-promoting component contains a compound having no hydroxyl group, and a temperature at which the foaming layer of the recording medium to which the foam-promoting liquid has been applied is heated is equal to or more than the foaming start temperature of the foaming particle reacted with the foam-promoting component and less than a maximum foaming temperature of the foaming particle.

In addition, the present invention provides a device for producing a recorded matter having a three-dimensional image, including: a foam-promoting liquid applying unit which applies, to a recording medium including a substrate and a foaming layer being provided on the substrate and containing a binder resin and a foaming particle which is foamed by heat, a foam-promoting liquid containing water and foam-promoting component which lowers a foaming start temperature of the foaming particle; and a heating unit which foams the foaming particle to form a three-dimensional image by heating the foaming layer of the recording medium to which the foam-promoting liquid has been applied, wherein the foaming particle includes: a shell layer containing a thermoplastic resin; and a volatile material encapsulated in the shell layer, the binder resin contains a water-insoluble resin, the foam-promoting component contains a compound having no hydroxyl group, and a temperature at which the foaming layer of the recording medium to which the foam-promoting liquid has been applied is heated is equal to or more than the foaming start temperature of the foaming particle reacted with the foam-promoting component and less than a maximum foaming temperature of the foaming particle.

Moreover, the present invention provides a foam-promoting liquid for use in a method for producing a recorded matter having a three-dimensional image including the steps of: applying, to a recording medium including a substrate and a foaming layer being provided on the substrate and containing a binder resin and a foaming particle which is formed by heat, a foam-promoting liquid containing water and a foam-promoting component which lowers a foaming start temperature of the foaming particle; and foaming the foaming particle to form a three-dimensional image by heating the foaming layer of the recording medium to which the foam-promoting liquid has been applied, wherein the foaming particle includes: a shell layer containing a thermoplastic resin; and a volatile material encapsulated in the shell layer, the binder resin contains a water-insoluble resin, the foam-promoting component contains a compound having no hydroxyl group, and a temperature at which the foaming layer of the recording medium to which the foam-promoting liquid has been applied is heated is equal to or more than the foaming start temperature of the foaming particle reacted with the foam-promoting component and less than a maximum foaming temperature of the foaming particle.

Further features of the present invention will become apparent from the following description of exemplary embodiments with reference to the attached drawings.

DESCRIPTION OF THE EMBODIMENTS

Figure 1:
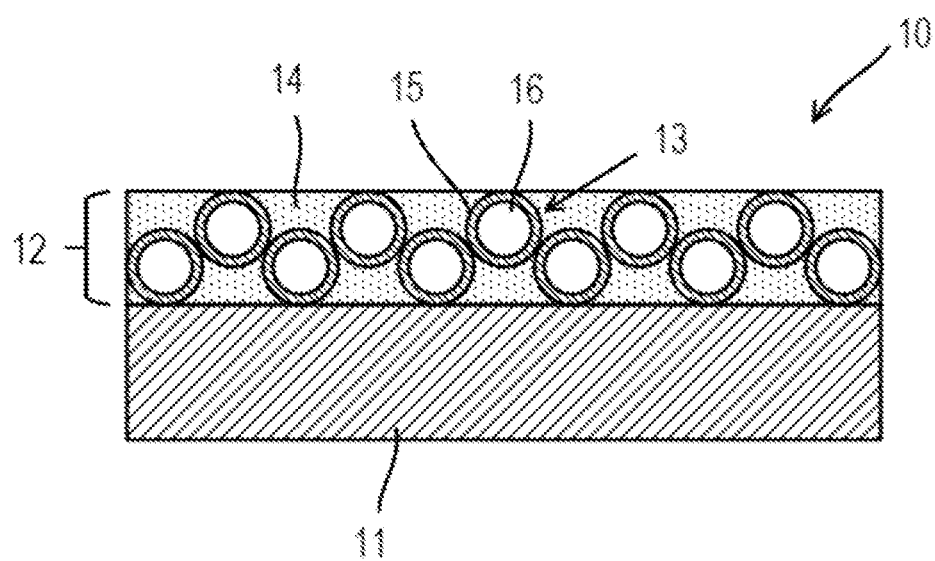
FIG. 1 is a cross-sectional view schematically showing an example of a recording medium used in a method for producing a recorded matter having a three-dimensional image of the present invention.

Hereinafter, the present invention will be further described in detail by presenting a preferred embodiment. Hereinafter, an aqueous ink for inkjet is referred to simply as an "ink" in some cases. Physical property values are values at ordinary temperature (25° C.) unless otherwise noted.

(Method for Producing a Recorded Matter Having a Three-Dimensional Image)

A method for producing a recorded matter having a three-dimensional image (hereinafter, also referred to simply as a "method for producing a recorded matter") of the present invention includes the steps of: applying a foam-promoting liquid to a recording medium; and foaming foaming particles to form a three-dimensional image. As the recording medium, a recording medium including: a substrate; and a foaming layer being provided on the substrate and containing a binder resin and foaming particles which are foamed by heat is used. In the step of applying a foam-promoting liquid to a recording medium, a foam-promoting liquid containing a foam-promoting component which lowers a foaming start temperature of the foaming particles is applied to the recording medium. In the step of foaming foaming particles to form a three-dimensional image, the foaming layer of the recording medium to which the foam-promoting liquid has been applied is heated to foam the foaming particles, thereby forming a three-dimensional image. In addition, the foaming particles each include: a shell layer containing a thermoplastic resin; and a volatile material encapsulated inside the shell layer. Then, the temperature at which the foaming layer of the recording medium to which the foam-promoting liquid has been applied is heated is equal to or more than a foaming start temperature of the foaming particles reacted with the foam-promoting component and less than a maximum foaming temperature of the foaming particles. Here, the maximum foaming temperature of the foaming particles is a maximum foaming temperature of the foaming particles not reacted with the foam-promoting component.

In the method for producing a recorded matter of the present invention, the foam-promoting liquid containing the foam-promoting component is applied to the recording medium having the foaming layer containing the foaming particles. The foam-promoting component is a component capable of lowering the foaming start temperature of the foaming particles. That is, among the foaming particle, the foaming start temperature of the foaming particles in the foaming layer of the recording medium to which the foam-promoting liquid has been applied has been lowered. For this reason, after the application of the foam-promoting liquid, when the foaming layer of the recording medium is heated to a temperature equal to or more than the foaming start temperature of the foaming particles reacted with the foam-promoting component and less than the maximum foaming temperature of the foaming particles, it is possible to efficiently foam the foaming particles in the foaming layer to which the foam-promoting liquid has been applied. In this way, a three-dimensional image in which a clear uneven structure has been expressed is formed, so that a target recorded matter can be obtained. In addition, as the foam-promoting component, a compound having no hydroxyl group is used. It is not necessarily clear why this foam-promoting component promotes the foaming at the time of heating the foaming particles. However, the present inventors have surmised that the foam-promoting component promotes the softening of the shell layers of the foaming particles or the binder resin in the foaming layer, and in turn improves the foamability of the foaming particle. In addition, the temperature at which the foaming layer to which the foam-promoting liquid has been applied is heated is preferably equal to or more than the foaming start temperature of the foaming particles reacted with the foam-promoting component and less than the maximum foaming temperature of the foaming particles reacted with the foam-promoting component. This makes it possible to effectively conduct the foaming of the foaming particles reacted with the foam-promoting component by heating, making it possible to form a three-dimensional image in which a clearer uneven structure has been expressed. In addition, the temperature at which the foaming layer to which the foam-promoting liquid has been applied is heated is preferably equal to or more than the foaming start temperature of the foaming particles reacted with the foam-promoting component and less than the foaming start temperature of the foaming particles not reacted with the foam-promoting component. This makes it possible to conduct the foaming of the foaming particle reacted with the foam-promoting component by heating while suppressing the foaming of the foaming particle not reacted with the foam-promoting component by heating, making it possible to form a three-dimensional image in which a clearer uneven structure has been expressed.

The foam-promoting liquid contains water together with the foam-promoting component. Against this, by using a water-insoluble resin as the binder resin contained in the foaming layer of the recording medium, it is possible to suppress dissolution of the binder resin by water in the foam-promoting liquid. As a result, a decrease in adhesion between the substrate and the foaming layer can be suppressed, and in turn the peeling of the foaming layer off the substrate when the foaming particles are foamed can be suppressed.

The foaming start temperature and the maximum foaming temperature of the foaming particles reacted with the foam-promoting component can be measured by a method given below. First, the foaming particles are immersed in the foam-promoting liquid containing the foam-promoting component for 10 seconds in order to bring the foaming particles into a state reacted with the foam-promoting component. As a sample, 25 µg of the foaming particles immersed in the foam-promoting liquid is placed in an aluminum container having a diameter of 7 mm and a depth of 1 mm. The aluminum container is mounted on a thermo-mechanical analyzer, and is heated from 60° C. to 200° C. at a heating rate of 5° C./min in a state where a load of 0.1 N is applied to the foaming particles from above, and an amount of displacement in the vertical direction of the measuring terminal (amount of displacement of the height of the portion occupied by the sample) is measured. Then, the temperature when the displacement started is used as the foaming start temperature of the foaming particles reacted with the foam-promoting component. In addition, the temperature when the amount of displacement reached the maximum is used as the maximum foaming temperature of the foaming particles reacted with the foam-promoting component. In addition, the foaming start temperature and the maximum foaming temperature of the foaming particles not reacted with the foam-promoting component means the following temperatures. That is, these temperatures respectively mean the temperature when the displacement started and the temperature when the amount of displacement reached the maximum, which are measured by the same method as in the above-described case of the foaming particles reacted with the foam-promoting component except that the foaming particles not reacted with the foam-promoting component are used as a sample.

The method for heating the foaming layer to which the foam-promoting liquid has been applied may be a method using a heating device capable of heating the foaming particles in the foaming layer to a desired temperature.

Any image may be recorded (printed) by applying an ink containing a dye or a pigment as a color material to the recording medium before or after the foam-promoting liquid is applied to the foaming layer, or before or after the foaming layer to which the foam-promoting liquid has been applied is heated. The printing may be made not only by an inkjet recording method which applies an ink with an inkjet system but also by printing methods such as an electrophotographic system using a toner, latex, UV, and sublimation transfer, for example. Among these, it is preferable to record an image by an inkjet recording method from the viewpoint that it is possible to record a finer image.

(Recording Medium)

FIG. 1 is a cross-sectional view schematically showing an example of a recording medium used in the method for producing a recorded matter having a three-dimensional image of the present invention. As shown in FIG. 1, a recording medium 10 includes: a substrate 11; and a foaming layer 12 being provided on the substrate 11 and containing foaming particles 13 which are foamed by heat. Hereinafter, the detail of the recording medium used in the method for producing a recorded matter of the present invention will be described.

[Substrate]

The substrate 11 functions as a support for supporting the foaming layer 12 (FIG. 1). The type of the substrate is not particularly limited. The substrate includes, for example, common paper made from natural pulp; kenaf paper; plastic film sheets of polypropylene, polyethylene, polyester, and the like; so-called synthetic paper and nonwoven fabric obtained by making synthetic fiber, synthetic pulp, and synthetic resin film into pseudo-paper; and the like.

[Foaming Layer]

As shown in FIG. 1, the foaming layer 12 is a layer being provided on at least one surface of the substrate 11 and containing the foaming particle 13 and a binder resin 14. Each of the foaming particles 13 is a thermally expandable microcapsule including: a capsule-shaped shell layer 15 containing a thermoplastic resin; and a volatile material 16 encapsulated inside the shell layer 15. When heat is applied to this foaming particle 13, the thermoplastic resin contained in the shell layer 15 is softened and the volatile material 16 encapsulated inside the shell layer 15 is vaporized, so that the volume is expanded. Hence, the foaming particle 13 is expanded like a balloon.

The thermoplastic resin contained in the shell layer includes, for example, polystyrene, styrene-acrylic acid ester copolymer, polyamide resin, polyacrylic acid ester, polyvinylidene chloride, polyacrylonitrile, polymethyl methacrylate, vinylidene chloride-acrylonitrile, methacrylic acid ester-acrylic acid copolymer, vinylidene chloride-acrylic acid copolymer, vinylidene chloride-acrylic acid ester copolymer, and the like.

The volatile material includes, for example, low molecular weight hydrocarbons such as ethane, ethylene, propane, propene, n-butane, isobutane, npentane, isopentane, neopentane, n-hexane, heptane, and petroleum ether; chlorofluorocarbons such as $CCl_3F$, $CCl_2F_2$, $CClF_3$, and $CClF_2—CClF_2$; tetraalkylsilanes such as tetramethyl silane, trimethyl ethyl silane, trimethylisopropylsilane, trimethyl-n-propyl silane; and the like. Among these, the volatile material is preferably a hydrocarbon having a molecular weight of 120 or less. In addition, the lower limit of the molecular weight of the volatile material (hydrocarbon) is not particularly limited, but, for example, preferably 50 or more. The content of the foaming particles in the foaming layer is preferably 5% by mass or more and 95% by mass or less based on the total mass of the foaming layer.

The foaming layer 12 contains the binder resin 14 in order to enhance the adhesion with the substrate 11 (FIG. 1). When the foaming particles in the foaming layer are foamed by heat, the binder resin plays an important role in suppressing the peeling of the foaming layer from the substrate. As the binder resin, a water-insoluble resin is used. When the binder resin contains a water-insoluble resin, the binder resin becomes unlikely to be dissolved in water in the foam-promoting liquid as well, thus making it possible to suppress a decrease in the adhesion between the substrate and the foaming layer by the foam-promoting liquid. Moreover, even when an aqueous ink containing water is added to the recording medium, it is possible to suppress a decrease in adhesion between the foaming layer and the substrate. Here, the water-insoluble resin refers to a resin 95% by mass or more of which remains in a case where the resin is immersed in warm water of 80° C. for 2 hours. The water-insoluble resin is preferably at least one selected from the group consisting of acrylic resins and urethane resins. In addition, the water-insoluble resin is further preferably at least one selected from the group consisting of acrylic resins that do not have an ester group and urethane resins do not have an ester group. Then, the water-insoluble resin is preferably a non-water-absorbable resin. The content of the water-insoluble resin in the foaming layer is preferably 10% by mass or more and 95% by mass or less based on the total mass of the foaming layer. In addition, the foaming layer may contain a water-soluble resin together with a water-insoluble resin as long as the advantageous effect of the present invention can be achieved. In addition, the glass transition temperature of the binder resin is preferably −10° C. or more and 30° C. or less. When the glass transition temperature of the binder resin is within the above-described range, it is possible to prevent the binder resin from inhibiting the foaming of the foaming particles.

The mass ratio between the foaming particles and the binder resin is preferably such that foaming particle:binder resin=5:95 to 90:10. By setting the mass ratio between the foaming particles and the binder resin within the above-described range, it is possible to improve both the foamability of the foaming particles and the binding property of the binder resin to the substrate. The foaming layer may further contain components such as a pigment, an antioxidant, a dye, and a surfactant as long as the foamability is not impaired.

(Method for Producing a Recording Medium)

In order to produce a recording medium, first a coating liquid for a foaming layer containing foaming particles is applied onto a surface of a substrate to form a coating layer. Subsequently, the coating layer thus formed is dried to form a foaming layer, so that a recording medium can be obtained. To apply the coating liquid for the foaming layer onto the surface of the substrate, a conventionally known air knife coater, die coater, blade coater, gate roll coater, bar coater, rod coater, roll coater, gravure coater, curtain coater, or the like may be used. The method for drying the coating layer includes, for example, a method including blowing hot air, and the like. The drying conditions (temperature, air flow amount, time, and the like) may be set as appropriate depending on the type of the substrate, the compositions of the coating liquid, and the like. However, the temperature at the time of drying needs to be lower than the foaming start temperature of the used foaming particles.

It is preferable to provide the foaming layer in 2 g/m² or more or more on one surface of the substrate. It further improves the foamability by providing the foaming layer in 2 g/m² or more. Note that a recording medium (product) in which a foaming layer containing foaming particles is provided in advance may be used.

Among the surfaces of the substrate, on a surface opposite to the surface on which the foaming layer is provided, a back coating layer may be provided. The back coating layer may be a layer identical to the foaming layer containing the foaming particles, or may be a layer different from the foaming layer. In addition, an adhesive layer containing an adhesive resin such as an acrylic resin and an ink receiving layer for fixing a color material may be formed.

(Foam-Promoting Liquid)

The foam-promoting liquid of the present invention is a foam-promoting liquid used in the aforementioned method for producing a recorded matter. The detail of the foam-promoting liquid will be described below.

[Foam-Promoting Component]

The foam-promoting liquid contains a foam-promoting component which lowers the foaming start temperature of the foaming particle. By applying the foam-promoting liquid containing the foam-promoting component to the foaming layer of the recording medium by a method such as ejection using an inkjet system or application, the thermoplastic resin contained in the shell layers of the foaming particles can be softened. It is surmised that as a result, the foaming start temperature and the maximum foaming temperature of the foaming particles can be shifted to a low temperature side.

The foam-promoting component may be a component which is capable of softening the thermoplastic resin contained in the shell layers of the foaming particles and which has no hydroxyl group, and may be selected and used as appropriate depending on the type of the thermoplastic resin or the like. The foam-promoting component includes, for example, 2-pyrrolidone, dimethyl sulfoxide, N,N-dimethylformamide, N-methyl-2-pyrrolidone, and the like. It is preferable that the boiling point of the compound having no hydroxyl group as the foam-promoting component be higher than the temperature at which the foaming layer is heated. When the boiling point of this compound is higher than the temperature at which the foaming layer is heated, this compound is unlikely to be vaporized even when the foaming layer is heated, thus contributing to the softening of the thermoplastic resin of the shell layers of the foaming particles. The content of the compound having no hydroxyl group as the foam-promoting component is preferably 10% by mass or more and 70% by mass or less based on the total mass of the foam-promoting liquid.

The absolute value ($|SP_1-SP_2|$) of a difference between the solubility parameter ($SP_1$) of the thermoplastic resin forming the shell layers of the foaming particles (microcapsules) and the solubility parameter ($SP_2$) of the foam-promoting component is preferably 3.5 or less. When the absolute value of the difference in solubility parameter is within the above-described numerical range, it is possible to further improve the foamability of the region to which the foam-promoting liquid containing the foam-promoting component is applied in the foaming layer.

In addition, it is preferable that the absolute value ($|HSP_1-HSP_2|$) of the difference between the solubility parameter ($HSP_2$) of the foam-promoting component and the Hansen solubility parameter ($HSP_1$) of the thermoplastic resin forming the shell layer of the foaming particle (microcapsules) be 20 or less. When the absolute value of the difference in Hansen solubility parameter is within the above-described numerical range, the foamability of the region to which the foam-promoting liquid containing the foam-promoting component is added in the foaming layer can be further improved.

The solubility parameters (SP values) of the thermoplastic resin and the foam-promoting component forming the shell layer are values that can be calculated. In addition, the Hansen solubility parameters (HSP values) of the thermoplastic resin and the foam-promoting component forming the shell layer are actual measured values measured and calculated in accordance with the dynamic light scattering.

[Other Components]

In the case where the foam-promoting component is a liquid at ordinary temperature (25° C.), the foam-promoting component itself may be used as a foam-promoting liquid. In addition, the foam-promoting liquid may further contain a component (another component) other than the foam-promoting component. For example, it is preferable that foam-promoting liquid further contain a liquid component such as a solvent in order to improve the ejection stability of the foam-promoting liquid. As the solvent, water-soluble organic solvents such as water can be used. As the water, it is preferable to use deionized water (ion-exchange water). The water-soluble organic solvent includes alcohols, glycols, glycol ethers, and nitrogen-containing compounds.

As the component other than the liquid component, a water-soluble organic compound which is solid at a temperature of 25° C., such as urea and derivatives thereof, trimethylolpropane, and trimethylolethane can be used. Moreover, the foam-promoting liquid may contain various additives such as a pH adjuster, an antifoam, an anti-rust agent, an antiseptic, a fungicide, an antioxidant, a reduction inhibitor, and a chelating agent, as necessary.

<Device for Producing a Recorded Matter Having a Three-Dimensional Image>

The device for producing a recorded matter having a three-dimensional image (hereinafter, also referred to simply as a "device for producing a recorded matter") of the present invention includes: a foam-promoting liquid applying unit that applies foam-promoting liquid to a recording medium; and a heating unit that heats a foaming layer of a recording medium to which the foam-promoting liquid has been added. The recording medium includes: a substrate; and a foaming layer provided on the substrate and containing a binder resin and foaming particles which are foamed by heat. The foam-promoting liquid contains water and a foam-promoting component which lowers a foaming start temperature of the foaming particles. The heating unit is a unit that heats the foaming layer of the recording medium to foam foaming particles, thereby forming a three-dimensional image. The foaming particles each include: a shell layer containing a thermoplastic resin; and a volatile material encapsulated in the shell layer. The binder resin in the foaming layer contains a water-insoluble resin, and the foam-promoting component contains a compound having no hydroxyl group. Then, the temperature at which the foaming layer of the recording medium to which the foam-promoting liquid has been applied is heated is equal to or more than a foaming start temperature of the foaming particles reacted with the foam-promoting component and less than a maximum foaming temperature of the foaming particles. The ink, the foam-promoting liquid, and the recording medium used in this device for producing a recorded matter are the same as the ink, the foam-promoting liquid, and the recording medium used in the aforementioned method for producing a recorded matter. The device for producing a recorded matter of the present invention can be favorably used in the aforementioned method for producing a recorded matter.

The device for producing a recorded matter may also include an ink container which holds an ink; and an ink applying unit for ejecting the ink from an inkjet recording head to record an image on a recording medium. In addition, the device for producing a recorded matter may also include a foam-promoting liquid container which holds the foam-promoting liquid. Furthermore, the device for producing a recorded matter may also include a transporting unit for transporting the recording medium.

The arrangement of the foam-promoting liquid applying unit, the ink applying unit, and the heating unit can be adjusted as appropriate. Hereinafter, the arrangement of the foam-promoting liquid applying unit, the ink applying unit, and the heating unit in the device for producing a recorded matter will be described with reference to the drawing.

Figure 2A:
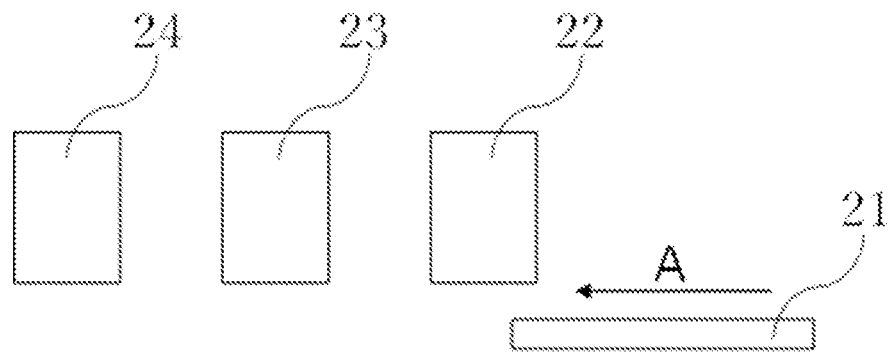
FIG. 2A is a schematic diagram showing one type of configuration of a device for producing a recorded matter having a three-dimensional image of the present invention.
Figure 2B:
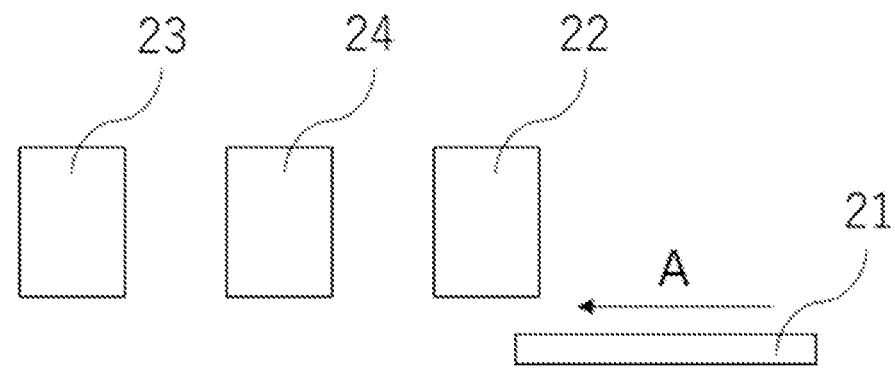
FIG. 2B is a schematic diagram showing another type of configuration of a device for producing a recorded matter having a three-dimensional image of the present invention.
Figure 2C:
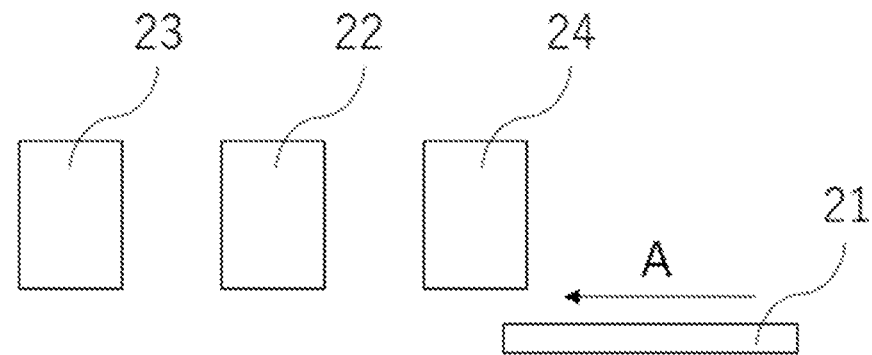
FIG. 2C is a schematic diagram showing still another type of configuration of a device for producing a recorded matter having a three-dimensional image of the present invention.

FIGS. 2A to 2C are schematic diagrams each showing a schematic configuration of the device for producing a recorded matter having a three-dimensional image of the present invention.

In the production device shown in each of FIGS. 2A to 2C, a recording medium 21 is transported in the direction of the arrow A by the transporting unit for transporting the recording medium. An ink applying unit 24 may be arranged upstream or downstream of a foam-promoting liquid applying unit 22, and may be arranged upstream or downstream of the heating unit 23, in the direction A of the transportation of the recording medium 21. FIG. 2A shows a configuration in which the ink applying unit 24 is arranged downstream of the foam-promoting liquid applying unit 22 and downstream of the heating unit 23 in the direction A of the transportation of the recording medium 21. FIG. 2B shows a configuration in which the ink applying unit 24 is arranged downstream of the foam-promoting liquid applying unit 22 and upstream of the heating unit 23 in the direction A of the transportation of the recording medium 21. FIG. 2C shows a configuration which the ink applying unit 24 is arranged upstream of the foam-promoting liquid applying unit 22 and upstream of the heating unit 23 in the direction A of the transportation of the recording medium 21.

The foam-promoting liquid can be applied onto the foaming layer of the recording medium 21 by ejecting the foam-promoting liquid from the recording head of the inkjet system included in the foam-promoting liquid applying unit 22 arranged at a predetermined position in the direction of transportation of the recording medium 21 (the direction of the arrow A in FIGS. 2A to 2C).

The heating unit 23 is a unit that heats the foaming layer of the recording medium 21 to which the foam-promoting liquid has been added. The heating unit 23 may be a heating device that is capable of heating the foaming particles in the foaming layer to a desired temperature. The heating unit includes, for example, a dryer, an oven, a heater, and an iron.

EXAMPLES

The present invention will be described in further detail by giving Examples and Comparative Examples, but the present invention is not limited to Examples described below at all without departing from the gist. The amounts of components described with "part" and "%" are in terms of mass unless otherwise noted.

<Preparation of Foaming Particles>

Foaming particles X, Y, and Z were prepared. The foaming particles X was trade name "Advancell EMH204", (produced by SEKISUI CHEMICAL CO., LTD., volatile material: isopentane (molecular weight 72.2)). The foaming particles Y was trade name "Expancel 007-40" (produced by Japan Fillite Co., Ltd., volatile material: isobutane (molecular weight 58.1)). And the foaming particle Z was trade name "Matsumoto Microsphere F-30" (produced by Matsumoto Yushi-Seiyaku Co., Ltd., volatile material: isopentane (molecular weight 72.1)). The shell layers of the foaming particles X, Y, and Z are thermoplastic resins. The foaming start temperatures and the maximum foaming temperatures of the foaming particles X, Y, and Z were measured by using a thermo-mechanical analyzer (TMA) (trade name "TMA2940", produced by TA instruments) as follows. In an aluminum container having a diameter of 7 mm and a depth of 1 mm, 25 μg of the sample was thrown in, and a load of 0.1 N was applied from above. In this state, the sample was heated from 60° C. to 200° C. at a heating rate of 5° C./min, and displacement in the vertical direction of the measuring terminal was measured. Then, the temperature at which the displacement started was measured as the "foaming start temperature" and the temperature at which the amount of displacement reached the maximum was measured as the "maximum foaming temperature". Results are shown in Table 1.

TABLE 1

| | Foaming start temperature (° C.) | Maximum foaming temperature (° C.) |
|---|---|---|
| Foaming particles X | 110 | 160 |
| Foaming particles Y | 91 | 138 |
| Foaming particles Z | 70 | 110 |

<Measurement of Foaming Start Temperature and Maximum Foaming Temperature of Foaming Particles Reacted with Foam-Promoting Component>

(Preparation of Foam-Promoting Liquids Used for Reacting the Foaming Particles with the Foam-Promoting Components)

Components A to I shown in Table 2 were prepared. 10 g of each of the components A to I was mixed with 90 g of water to form a liquid as a foam-promoting liquid (foam-promoting liquids A' to I' respectively) containing 10 g of each component and 90 g of water (component E was 100% of water). These foam-promoting liquids A' to I' were reacted with 20 g of foaming particles (foaming particles X, Y, and Z) shown in Table 2. Thereafter, the foaming start temperature and maximum foaming temperature of each set of foaming particles reacted with the foam-promoting component were measured by the same method as in the case of foaming particles not reacted with foam-promoting component. Results of measurement are shown in Table 2.

TABLE 2

| Foam-promoting Component | Foaming particles X | | | Foaming particles Y | | | Foaming particles Z | | |
|---|---|---|---|---|---|---|---|---|---|
| | P | Q | R | P | Q | R | P | Q | R |
| A | 90 | ≤3.5 | ≤20 | 75 | ≤3.5 | ≤20 | — | — | — |
| B | 80 | ≤3.5 | ≤20 | 70 | ≤3.5 | ≤20 | — | — | — |
| C | 100 | ≤3.5 | ≤20 | 80 | ≤3.5 | ≤20 | — | — | — |
| D | 100 | ≤3.5 | ≤20 | 80 | ≤3.5 | ≤20 | — | — | — |
| E | 110 | >3.5 | >20 | 91 | >3.5 | >20 | — | — | — |
| F | 110 | >3.5 | >20 | 91 | >3.5 | >20 | — | — | — |
| G | 110 | >3.5 | >20 | 91 | >3.5 | >20 | — | — | — |
| H | — | — | — | 89 | >3.5 | ≤20 | 65 | ≤3.5 | ≤20 |
| I | — | — | — | 85 | ≤3.5 | ≤20 | — | — | — |

Note that meanings of the symbols in Table 2 are shown below.
P: Foaming start temperature after reaction of components (° C.)
Q: |SP$_1$-SP$_2$|
R: |HSP$_1$-HSP$_2$|
A: 2-pyrrolidone (boiling point 245° C.)
B: DMSO (dimethyl sulfoxide) (boiling point 189° C.)
C: DMF (N,N-dimethylformamide) (boiling point 153° C.)
D: NMP (N-methyl-2-pyrrolidone) (boiling point 202° C.)
E: Water (boiling point 100° C.)
F: iPrOH (isopropanol) (boiling point 83° C.)
G: Hexane (boiling point 69° C.)
H: PGME (propylene glycol monomethyl ether) (boiling point 121° C.)
I: Glycerin (boiling point 290° C.)

<Preparation of Recording Medium>
(Recording Medium X)

As a substrate, a polypropylene synthetic paper (trade name "New Yupo FGS110", produced by Yupo Corporation) was prepared. To ion-exchange water, 100 parts of an acrylic resin having a glass transition temperature of 0° C. and 50 parts of the foaming particle X were added, followed by sufficiently stirring to obtain a coating liquid X. The obtained coating liquid X was applied onto the substrate such that the applied amount became 40 g/m$^2$, followed by drying in an oven of 80° C. for 5 minutes to form a foaming layer, thus obtaining a recording medium X. Note that the acrylic resin used for preparing this recording medium X was a water-insoluble and non-water-absorbable resin, and have no ester group.

(Recording Medium Y)

A recording medium Y was obtained in the same manner as for the aforementioned recording medium X except the coating liquid Y was obtained by using the foaming particles Y instead of the foaming particles X and the coating liquid Y was used instead of the coating liquid X.

(Recording Medium Z)

A coating liquid Z was obtained by using the foaming particles Z instead of the foaming particles X and using polyvinylpyrrolidone, which is a water-absorbable resin, instead of an acrylic resin. Then, the coating liquid Z was applied onto the substrate instead of the coating liquid X, and dried in an oven of 60° C. for 5 minutes. Except for these, a recording medium Z was obtained in the same manner as for the aforementioned recording medium X.

(Recording Medium W)

A recording medium W was obtained in the same manner as for the aforementioned recording medium Z except that a coating liquid Z was obtained by using an acrylate ester having an ester group instead of polyvinylpyrrolidone.

<Preparation of Foam-Promoting Liquid to be Applied to Recording Medium>

A foam-promoting liquid A was obtained by mixing 30 parts of the component A, 0.5 parts of a nonionic surfactant (trade name "Acetylenol E100", produced by Kawaken Fine Chemicals Co., Ltd.), and 69.5 parts of ion-exchange water, followed by sufficiently stirring, and filtrated with pressure with a filter having a pore size of 1.2 μm. Then, a foam-promoting liquids B to I were obtained in the same manner as for the aforementioned foam-promoting liquid A except that components B to I were used instead of the component A.

<Production of Recorded Matter>

Cartridges were filled with the foam-promoting liquids A to I, respectively, and were attached to an inkjet recording apparatus (trade name "PIXUS MG3630", manufactured by Canon Inc.). In the present Examples, the recording duty of an image recorded under conditions that two ink droplets of about 11.2 ng each are applied to a unit region of 1/600 inches×1/600 inches is defined to be 100%.

Example 1

The foam-promoting liquid A was applied to the foaming layer of the recording medium X such that the recording duty became 100% by using the above-described inkjet recording apparatus. Thereafter, the foaming layer to which the foam-promoting liquid A had been applied was heated to 150° C. by using a hot air gun (trade name "HL2010E1", manufactured by SAKAGUCHI E.H VOC CORP.). In this way, a three-dimensional image was formed by foaming the foaming particles X in the foaming layer to which the foam-promoting liquid A had been applied to obtain a recorded matter 1.

Examples 2 to 8 and Comparative Examples 1 to 19

Recorded matters 2 to 8 and 10 to 28 were obtained in the same manner as for the aforementioned Example 1 except that the conditions shown in Table 3 were employed.

Example 9

The foam-promoting liquid B was applied onto the foaming layer of the recording medium Y by using Polyspoit. Thereafter, the foaming layer to which the foam-promoting liquid B had been applied was heated to 80° C. by using a hot air gun (trade name "HL2010E1", manufactured by SAKAGUCHI E.H VOC CORP.). In this way, a three-dimensional image was formed by foaming the foaming particles Y in the foaming layer to which the foam-promoting liquid B had been applied to obtain a recorded matter 9.

<Evaluation>

(Unevenness)

The surface of each recorded matter thus produced was visually observed to evaluate the unevenness in accordance with the evaluation criteria given below. Results are shown in Table 3.

A: It was possible to observe unevenness.

C: It was not possible to observe unevenness.

(Peeling of Foaming Layer Off Substrate after Heating)

The surface of each recorded matter thus produced was visually observed to check whether or not the foaming layer was peeled off the substrate after heating in accordance with the evaluation criteria given below. Results are shown in Table 3.

A: Peeling of the foaming layer off the substrate was not observed.

C: Peeling of the foaming layer off the substrate was observed.

TABLE 3

| | P1 | P2 | P3 | Q1 | Q2 | Q3 | R1 | R2 |
|---|---|---|---|---|---|---|---|---|
| Example 1 | 1 | A | X | 90 | 160 | 150 | A | A |
| Example 2 | 2 | B | X | 80 | 160 | 150 | A | A |
| Example 3 | 3 | C | X | 100 | 160 | 150 | A | A |
| Example 4 | 4 | D | X | 100 | 160 | 150 | A | A |
| Example 5 | 5 | B | Y | 70 | 138 | 135 | A | A |
| Example 6 | 6 | A | X | 90 | 160 | 100 | A | A |
| Example 7 | 7 | B | X | 80 | 160 | 100 | A | A |
| Example 8 | 8 | B | Y | 70 | 138 | 80 | A | A |
| Example 9 | 9 | B | Y | 70 | 138 | 80 | A | A |
| Comparative Example 1 | 10 | A | X | 90 | 160 | 40 | C | A |
| Comparative Example 2 | 11 | B | X | 80 | 160 | 40 | C | A |
| Comparative Example 3 | 12 | B | Y | 70 | 138 | 40 | C | A |
| Comparative Example 4 | 13 | A | X | 90 | 160 | 200 | C | A |
| Comparative Example 5 | 14 | B | X | 80 | 160 | 200 | C | A |
| Comparative Example 6 | 15 | B | Y | 70 | 138 | 200 | C | A |
| Comparative Example 7 | 16 | E | X | 110 | 160 | 150 | C | A |
| Comparative Example 8 | 17 | F | X | 110 | 160 | 150 | C | A |
| Comparative Example 9 | 18 | G | X | 110 | 160 | 150 | C | A |
| Comparative Example 10 | 19 | G | Y | 91 | 138 | 135 | C | A |
| Comparative Example 11 | 20 | F | X | 110 | 160 | 200 | C | A |
| Comparative Example 12 | 21 | G | X | 110 | 160 | 200 | C | A |
| Comparative Example 13 | 22 | G | Y | 91 | 138 | 200 | C | A |
| Comparative Example 14 | 23 | — | X | — | 160 | 100 | C | A |
| Comparative Example 15 | 24 | — | Y | — | 138 | 80 | C | A |
| Comparative Example 16 | 25 | H | Z | 65 | 110 | 100 | A | C |
| Comparative Example 17 | 26 | H | Y | 89 | 138 | 80 | C | A |
| Comparative Example 18 | 27 | I | Y | 85 | 138 | 80 | C | A |
| Comparative Example 19 | 28 | H | W | 65 | 110 | 120 | A | C |

Note that meanings of the symbols in Table 3 are shown below.
P1: Recorded matter
P2: Foam-promoting liquid
P3: Recording medium
Q1: Foaming start temperature after reaction of components (° C.)
Q2: Maximum foaming temperature of the foaming particles (° C.)
Q3: Heating temperature (° C.)
R1: Result of evaluation (unevenness)
R2: Peeling of the foaming layer off the substrate The present invention can provide a method for producing a recorded matter having a three-dimensional image, capable of easily forming a three-dimensional image in which clear unevenness is expressed and suppressing peeling of the foaming layer off the substrate. In addition, the present invention can provide a device for producing a recorded matter having a three-dimensional image, capable of easily forming a three-dimensional image in which clear unevenness is expressed and suppressing peeling of the foaming layer off the substrate. Moreover, the present invention can provide a foam-promoting liquid for use in the above-described method for producing a recorded matter having a three-dimensional image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A method for producing a recorded matter having a three-dimensional image, comprising the steps of:

applying, to a recording medium including a substrate and a foaming layer provided on the substrate and containing a binder resin and a foaming particle which is foamed by heat, a foam-promoting liquid containing water and a foam-promoting component which lowers a foaming start temperature of the foaming particle such that the foaming particle at a first position of the recording medium is reacted with the foam-promoting component while the foaming particle at a second position of the recording medium is not reacted with the foam-promoting component; and heating the foaming layer of the recording medium to form a three-dimensional image by promoting foaming of the foaming particle reacted with the foam-promoting component at the first position of the recording medium to which the foam-promoting liquid has been applied while suppressing foaming of the foaming particle unreacted with the foam-promoting component at the second position of the recording medium to which the foam-promoting liquid has not been applied, wherein the foaming particle includes: a shell layer containing a thermoplastic resin; and a volatile material encapsulated in the shell layer, wherein the binder resin contains a water-insoluble resin, wherein the foam-promoting component contains a compound having no hydroxyl group, and wherein a temperature at which the foaming layer of the recording medium to which the foam-promoting liquid has been applied is heated is equal to or more than the foaming start temperature of the foaming particle reacted with the foam-promoting component and less than a maximum foaming temperature of the foaming particle unreacted with the foam-promoting component.

2. The method according to claim 1, wherein the volatile material is a hydrocarbon having a molecular weight of 120 or less.

3. The method according to claim 1, wherein a content of the foaming particle in the foaming layer is 5% by mass to 95% by mass based on a total mass of the foaming layer.

4. The method according to claim 1, wherein the water-insoluble resin is a non-water-absorbable resin.

5. The method according to claim 1, wherein the water-insoluble resin is at least one selected from the group consisting of acrylic resins having no ester group and urethane resins having no ester group.

6. The method according to claim 1, wherein a content of the water-insoluble resin in the foaming layer is 10% by mass to 95% by mass based on a total mass of the foaming layer.

7. The method according to claim 1, wherein a boiling point of the compound is higher than the temperature at which the foaming layer of the recording medium to which the foam-promoting liquid has been applied is heated.

8. The method according to claim 1, wherein the compound is at least one selected from the group consisting of 2-pyrrolidone, dimethyl sulfoxide, N,N-dimethylformamide, and N-methyl-2-pyrrolidone.

9. The method according to claim 1, wherein a content of the compound in the foam-promoting liquid is 10% by mass to 70% by mass of less-based on a total mass of the foam-promoting liquid.

10. The method according to claim 1, wherein an absolute value (|HSP1-HSP2|) of a difference between a Hansen solubility parameter (HSP1) of the thermoplastic resin and a Hansen solubility parameter (HSP2) of the foam-promoting component is 20 or less.

11. A device for configured to produce a recorded matter having a three-dimensional image, comprising:

a foam-promoting liquid applying unit configured to apply, to a recording medium including a substrate and a foaming layer provided on the substrate and containing a binder resin and a foaming particle which is foamed by heat, a foam-promoting liquid containing water and foam-promoting component which lowers a foaming start temperature of the foaming particle such that the foaming particle at a first position of the recording medium is reacted with the foam-promoting component while the foaming particle at a second position of the recording medium is not reacted with the foam-promoting component; and a heating unit configured to heat the foaming layer of the recording medium to form a three-dimensional image by promoting foaming of the foaming particle reacted with the foam-promoting component at the first position of the recording medium to which the foam-promoting liquid has been applied while suppressing foaming of the foaming particle unreacted with the foam-promoting component at the second position of the recording medium to which the foam-promoting liquid has not been applied, wherein the foaming particle includes: a shell layer containing a thermoplastic resin; and a volatile material encapsulated in the shell layer, wherein the binder resin contains a water-insoluble resin, wherein the foam-promoting component contains a compound having no hydroxyl group, and wherein a temperature at which the foaming layer of the recording medium to which the foam-promoting liquid has been applied is heated is equal to or more than the foaming start temperature of the foaming particle reacted with the foam-promoting component and less than a maximum foaming temperature of the foaming particle unreacted with the foam-promoting component.

12. A foam-promoting liquid comprising water and a foam-promoting component which lowers a foaming start temperature of a foaming particle, wherein the foam-promoting liquid is suitable for use in a method for producing a recorded matter having a three-dimensional image comprising the steps of:

applying, to a recording medium including a substrate and a foaming layer being-provided on the substrate and containing a binder resin and the foaming particle, the foam-promoting liquid such that the foaming particle at a first position of the recording medium is reacted with the foam-promoting component while the foaming particle at a second position of the recording medium is not reacted with the foam-promoting component; and heating the foaming layer of the recording medium to form a three-dimensional image by promoting foaming of the foaming particle reacted with the foam-promoting component at the first position of the recording medium to which the foam-promoting liquid has been applied while suppressing foaming of the foaming particle unreacted with the foam-promoting component at the second position of the recording medium to which the foam-promoting liquid has not been applied, wherein the foaming particle includes: a shell layer containing a thermoplastic resin; and a volatile material encapsulated in the shell layer, wherein the binder resin contains a water-insoluble resin, wherein the foam-promoting component contains a compound having no hydroxyl group, and wherein a temperature at which the foaming layer of the recording medium to which the foam-promoting liquid has been applied is heated is equal to or more than the foaming start temperature of the foaming particle reacted with the foam-promoting component and less than a maximum foaming temperature of the foaming particle unreacted with the foam-promoting component.

* * * * *